United States Patent [19]
Woltjen

[11] 4,036,374
[45] July 19, 1977

[54] MULTI-MOTION PARTS HANDLER

[75] Inventor: Duane W. Woltjen, Manchester, Mo.

[73] Assignee: AMC Industries, Inc., Stamford, Conn.

[21] Appl. No.: 628,474

[22] Filed: Nov. 4, 1975

[51] Int. Cl.² .............................................. B65G 47/91
[52] U.S. Cl. ................................. 214/1 BB; 198/486; 214/1 BH; 214/1 BC; 214/1 BT; 214/1 CM
[58] Field of Search .................. 214/1 B, 1 BB, 1 BT, 214/1 CM, 1 BC, 1 BH, 1 BD, 1 BV; 74/25, 24, 23, 53–56; 198/486

[56] References Cited

U.S. PATENT DOCUMENTS

| | | | |
|---|---|---|---|
| 1,459,796 | 6/1923 | Penney et al. | 74/426 |
| 2,924,101 | 2/1960 | Sherman | 74/23 X |
| 2,974,811 | 3/1961 | Dammert et al. | 214/1 BC |
| 3,007,097 | 10/1961 | Shelley et al. | 214/1 CM X |
| 3,326,058 | 6/1967 | Morrison | 74/426 X |
| 3,751,997 | 8/1973 | Owen, Jr. et al. | 214/1 BB X |
| 3,753,489 | 8/1973 | Tomioka et al. | 214/1 BB X |
| 3,817,116 | 6/1974 | Georgieff | 74/426 |
| 3,857,496 | 12/1974 | Gonzales | 74/23 X |
| 3,865,253 | 2/1975 | Healy | 214/1 BT |
| 3,951,271 | 4/1976 | Mette | 214/1 CM |

Primary Examiner—Frank E. Werner
Attorney, Agent, or Firm—Paul M. Denk

[57] ABSTRACT

A multi-motion parts handler including a transfer arm that is mounted for reciprocal movement through the agency of mechanical power derived from a motor or the like, the conveying structure of the arm is further mounted for both reciprocal movement in a vertical direction and oscillating movement in a transverse direction, with both of said movements being derived from a roller gear indexing drive operatively associated with a lower segment of the shaft that mounts the conveying member of the transfer arm. The reciprocal movement of the arm may also be derived from said indexing drive through the agency of a lever communicating with a face cam track provided to one side of the cam and which motivates a second shaft coaxially arranged within said first shaft, or the reciprocating movement to said arm may be acquired from another cam that actuates a follower provided upon said second shaft and which induces its basic lineal reciprocating movement.

17 Claims, 9 Drawing Figures

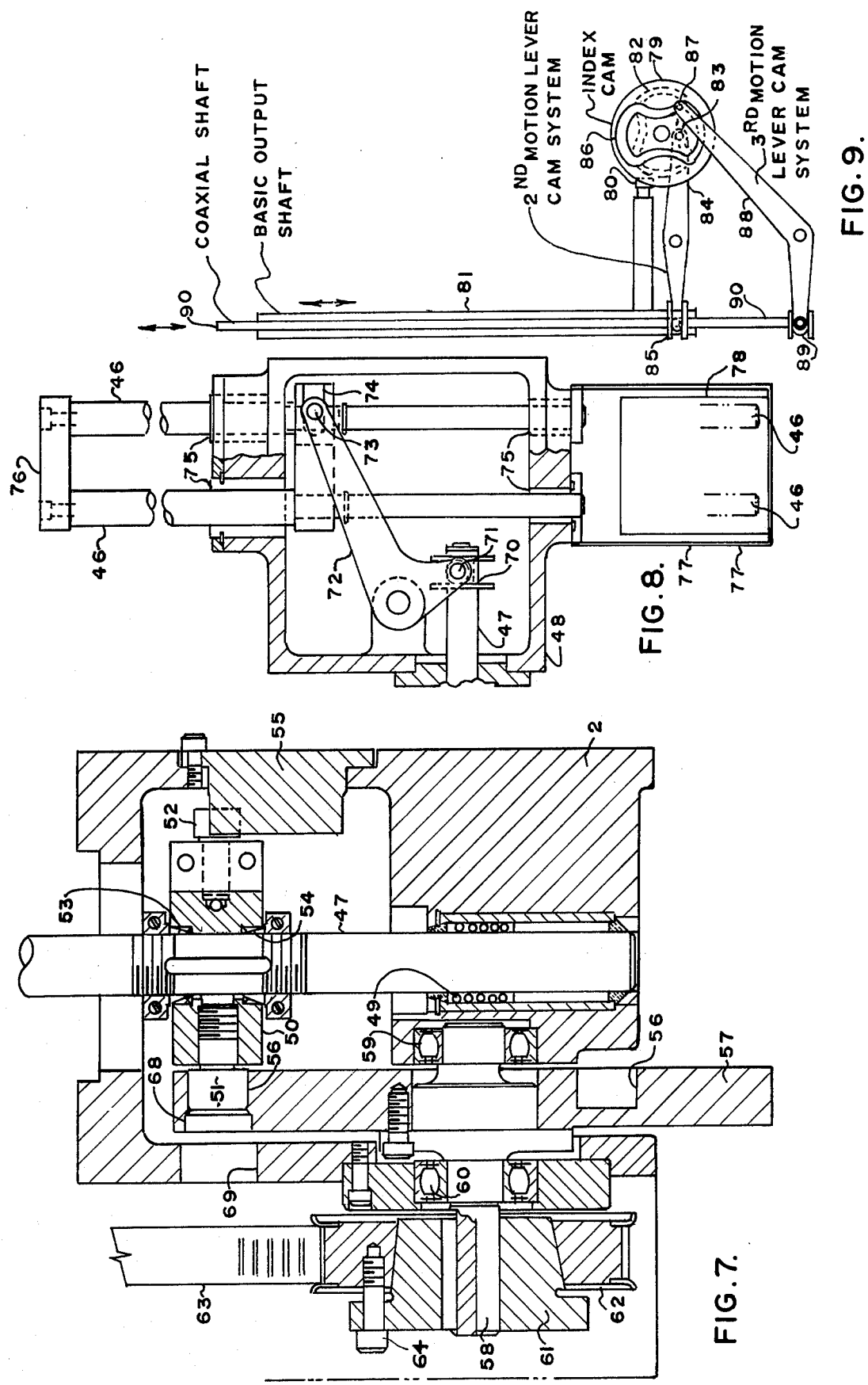

MULTI-MOTION PARTS HANDLER

BACKGROUND OF THE INVENTION

This invention relates generally to parts handling, but more particularly, pertains to means for providing a variety of motions to an apparatus for transferring of parts from one specific location and precisely to another location, or vice versa.

Various style of apparatuses and mechanisms have been devised in the past for providing some degree of automation to the handling of components particularly during assembly line processing and manufacturing operations. Frequently, these apparatuses usually incorporate some form of camming means or servomechanisms that are useful for providing usually a singular motion, and in certain instances, some double motion, that is useful for providing transfer or manipulation of the components being processed. Two stage movements of parts by means of a handling device have been available in the prior art, generally for lifting a part from one position, and pivoting it to another for placement prior to its being acted upon by a machine tool or the like. But the particular style of mechanism shown in the present invention is designed to enhance both the variety of positional movements provided to the part being tranferred, and to do so with mechanical means that are highly efficient and precisely accurate in their actuation, preferably incorporating the very close tolerance form of roller gear indexing drive where possible to achieve such accuracy. The use of a common linkage or a camming mechanism to acquire lineal movement from rotational movement are too numerous to cite, since the prior art is replete with such type of mechanisms. On the other hand, the incorporation of the roller gear drive into such apparatuses to achieve the type of fine accuracy required during parts handling and movement is what is contemplated and attained from the invention to be hereinafter disclosed.

It is, therefore, the principal object of this invention to provide a combination of linear and pivotal motions from an apparatus incorporating the roller gear drive which is essentially used to achieve most of the base movements that are converted to the variety of motions considered essential for the transfer of the parts being handled.

A further object of this invention is to provide a multi-motion parts handler that may achieve at least two motions for the transfer of parts from one location and to another and the intended location where it is to be processed.

Another object of this invention is to provide a parts handler incorporating a precisely operating roller gear drive as the essence of its conversion of motor power to various lineal, pivotal, reciprocating and oscillating movements, or a combination of such.

A further object of this invention is to provide a multi-motion parts handler that may obtain its basic power from a single motor means and which may, or may not, be used in conjunction with a speed reducer.

A further object of this invention is to provide a parts handler that may transfer parts at a speed in excess of sixty per minute and through a displacement exceeding many inches upon a transverse oscillation at least up to 180° or more.

A further object of this invention is to provide a parts handler that utilizes the roller gear drive as the essence of its conversion of motor power into a plurality of cooperating and precisely timed movements.

An additional object of this invention is to provide a parts handler that may be expediently assembled from a variety of components to furnish multi-motions for achieving specific transfer of a part of parts from one precise situs to another, or perhaps even retract the same.

These and other objects will become more apparent to those skilled in the art upon reviewing the summary of this invention, and after a consideration of the description of its preferred embodiment in view of its drawings.

SUMMARY OF THE INVENTION

This invention includes a structure which stably mounts a roller gear indexing drive including an indexing cam that cooperates with the followers of a roller follower hub and which connect with a shaft that furnishes both, in the preferred embodiment, vertically reciprocating movement and laterally or transverse oscillating movement to a transfer and conveying means. This conveying means incorporates at least one transfer arm that may also be shifted in reciprocating movement in a lineal direction and may have provided upon its pick-up head any type of lift means that allows the retention or release of the parts being transferred. These lift means may include any form of mechanical, pneumatic, or electro-mechanical parts holding devices that are available in the art and for use as the means for temporarily but firmly securing a part during its transfer. These type of devices are readily available in the art, but when used in conjunction with the parts handler of this invention, provides for the pick-up, transfer, and placement of parts in an accurate, safe, and tireless manner.

The parts handler of this invention may be employed, obviously, as an accessory to the loading or unloading of various types of machine tools, such as dial feeds or other in-line transferring systems, or the handler may be used to simply place the part accurately and directly into the die or other device whereat the part is to be worked.

The roller gear indexing drive of this invention may be formed of a single or multi cam actuated type, and may provide for either a double linear/reciprocating or a double linear/linear movement of the parts being transferred. A single indexing cam may be utilized for providing at least three of the aforesaid end movement of the parts being handled, or a pair of said cams may be utilized for this purpose. In addition, a single cam may be utilized to provide for two of the aforesaid movements, and used in conjunction with other motor means for providing a further reciprocal movement for the transfer arm of the parts handler in a lineal direction.

Which ever style of movement is desired to be achieved from the structural organization of the parts handler of this invention, the variety of movements attained during its operation are intended to be coordinated so that the repeated transfer of a part to be worked from one position and through a variety of precise motions to another and the intended position can be achieved. For example, and as shown in FIG. 4 of the drawings, it can be seen that one style of this invention, in this particular example being the multi-motions of the preferred embodiment, is intended to achieve three various motions in sequence to the transfer arm of the conveying means of this invention so as to achieve the precise positioning of the parts being handled. As shown, the roller gear drive as incorporated within the housing of this invention is capable of attaining both an oscillating movement for the conveying structure of the transfer arm, generally this movement being made somewhat laterally of the handler and pivotally through an arc of anywhere from a few degrees to one as great as 180° or more. These sequence of movements are identified as the oscillating cam segment of the roller gear drive, and it can be seen that the indexing of the transfer arm through its arc, and then its return, was made through a 75° index of the cam with an intermediate dwell portion therein during which a corresponding motion, identified as the reciprocating cam motion, is further effected of the transfer arm. Where the roller gear drive of this invention further induces a vertical reciprocating motion to the shaft that supports its transfer arm, obviously this reciprocating vertical movement normally should be attained at a time during which the oscillations effected by the cam are in their periods of dwell. From a least wear upon the indexing drive standpoint, this is most desirable. This is so because in the preferred embodiment of this invention these two oscillating and reciprocating movements are functionally achieved through a single shaft structure. On the other hand, this invention further contemplates the achievement of another or additional movements as may be required so as to accomplish its desired transfer of the part from one specified position to another. This particular movement is identified in this particular FIG. 4 as the in and out motion for the transfer arm, and since it may be achieved, and is achieved, in the preferred embodiment, through the agency of another shaft or motion inducing means, its particular motions, such as the retract and extend motions as shown, may be performed without regard to the performance of the oscillating or reciprocating motions as aforesaid with the exception that there must be at least one segment, albeit temporarily, when all of these motions attain a slight period of simultaneous dwell, at which time the part to be transferred is either being picked up or deposited at the specified locations. The standard timing sequence disclosed in this FIG. 4 is set forth as a display of a sequence of a plurality of motions that may be attained from a multi-motion parts handler such as will be hereinafter described in detail. Obviously, the robotics of any such mechanism must be coordinated and interrelated in their functioning so as to achieve the particular end results as may be required and desired for the specific type of function to be performed upon the style of part or parts to be handled.

BRIEF DESCRIPTION OF THE DRAWINGS

In referring to the drawings, FIG. 1 provides a side view of the multi-motion parts handler of this invention;

FIG. 7 provides a vertical section of the base of this invention taken along the line 7—7 of FIG. 1;

FIG. 8 provides a vertical section taken through the conveying means and transfer arm section of this invention, and taken generally along the line 8—8 of FIG. 2; and FIG. 9 displays a schematic of a modified form of indexing drive that is useful for attaining at least three motions for the transfer arm of this invention.

DESCRIPTION OF THE PREFERRED EMBODIMENT

Figure 1:
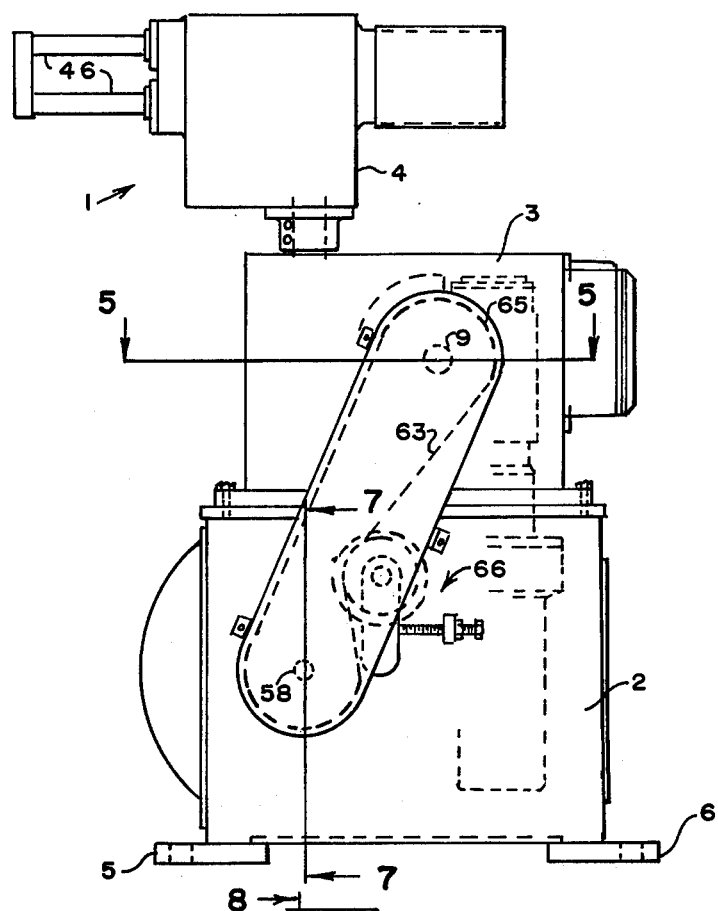
Figure 2:
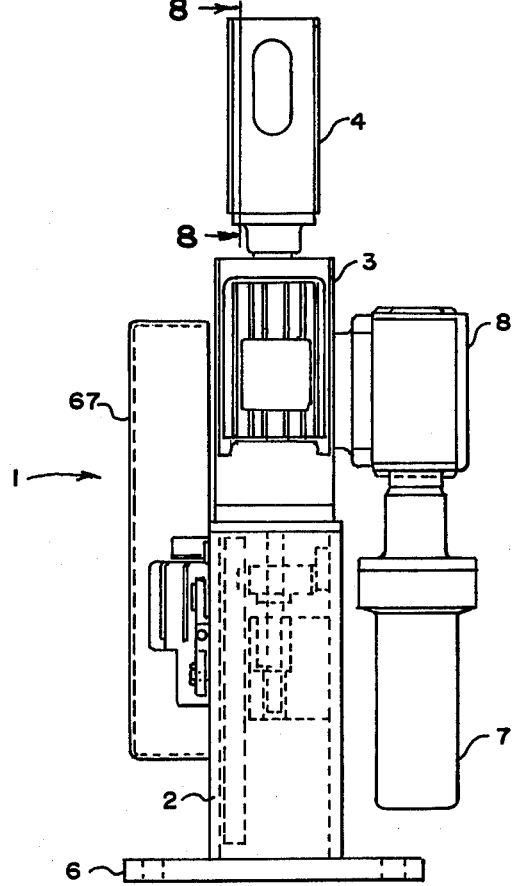
FIG. 2 provides a back side view of the multi-motion parts handler of this invention.
Figure 3:
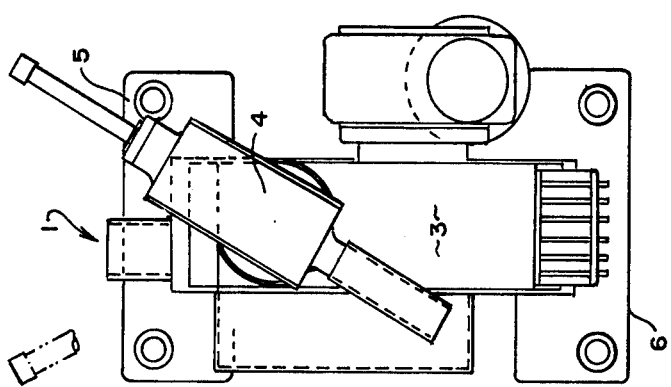
FIG. 3 provides a top or plan view of the multimotion parts handler of this invention.

In referring to FIGS. 1 through 3 of the drawings, there is disclosed the multi-motion parts handler 1 of this invention, which includes a base portion 2 that supports the controller section 3 having the conveying section 4 arranged there above. The base portion 2 is provided with foot flanges 5 and 6 that facilitate the stable mounting of this handler upon the ground or other surface.

Further disclosed in FIG. 2 is a power supply 7 that provides the main motor power for functioning of this invention, and any type of motor that is available in the art and for use in driving various camming mechanisms may be utilized for this purpose, although in the preferred embodiment there is used a one horsepower permanent magnet direct current variable speed motor capable of achieving between 0 to 1800 rpm. Preferbly the motor operates upon 90 volts direct current full wave rectified supply power. This power supply 7 is shown connected with a speed reducer 8 which may be of any design currently available upon the market and for use in reducing the identified revolutions of the motor drawn down to a vicinity that provides for the turn of the camming mechanisms of this invention within a designed speed of between ten to sixty rpms, although other attained speeds of revolution may be achieved as desired. The intergral reducer as used in this invention may comprise the standard worm and gear type reducer that are manufactured to especially close tolerances, and may be mounted in cooperation with the identified power supply, or into other positions than that shown in the aforesaid figure, provided that it may yet still transfer rotational power to the camming mechanisms of this invention as will be hereinafter described. In addition, a motor controller (not shown) may be utilized in conjunction with the power supply 7 of this invention so as to provide for the conversion of the input of 115 volts-alternating current, single phase 60 Hz standard line current to the voltage requirements of the motor as previously defined.

The speed reducer 8 of this invention is connected to the cam shaft 9 of the roller gear drive 10 of the controller section 3 of this device. See FIGS. 5 and 6. This roller gear drive includes the indexing cam 11 that cooperates with the roller follower hub 12, which intermeshes with said cam, and when rotated provides for an indexed turn of said hub through the agency of its plurality of followers 13.

This controller section 3 of the invention is embodied within a housing 14, having a cover 15 secured thereto by means of a series of cap screws, one as shown at 16. The housing is provided with apertures 17 through each of its sides and into which the bearing mounts 18 are secured by means of the series of fasteners 19 for arranging the plurality of bearings 20 upon their races 21. Oil seals, as at 22, are provided to either side of the housing so as to prevent the escape of any lubricating oil proximate the rotatably cam shaft 9. Also provided in the housing 14 of this controller section 3 are a drain plug 23, an oil gauge 24, and a vent plug 25, that are useful for regulating the quantity of lubricating oil normally maintained within this section of the parts handler, and available for lubricating the roller gear indexing drive 10 arranged therein.

This roller gear indexing drive 10 includes the indexing cam 11, as previously explained, and the particular cam shown therein comprises a type of dwell inside cam of the style disclosed in the United States patent to Georgieff, in U.S. Pat. No. 3,817,116, and owned by a common assignee. Although, other forms of custom cams may be utilized in this particular roller gear drive such as barrel cams, or a dwell outside cam having a single tapered rib and useful for cooperating with a pair of adjacent followers of the roller hub as shown. These various styles of cams are readily available in the art, and are of precision operation incorporating the zero backlash feature that provides for a precise, almost vibration-free. rotating motion.

Figure 4:
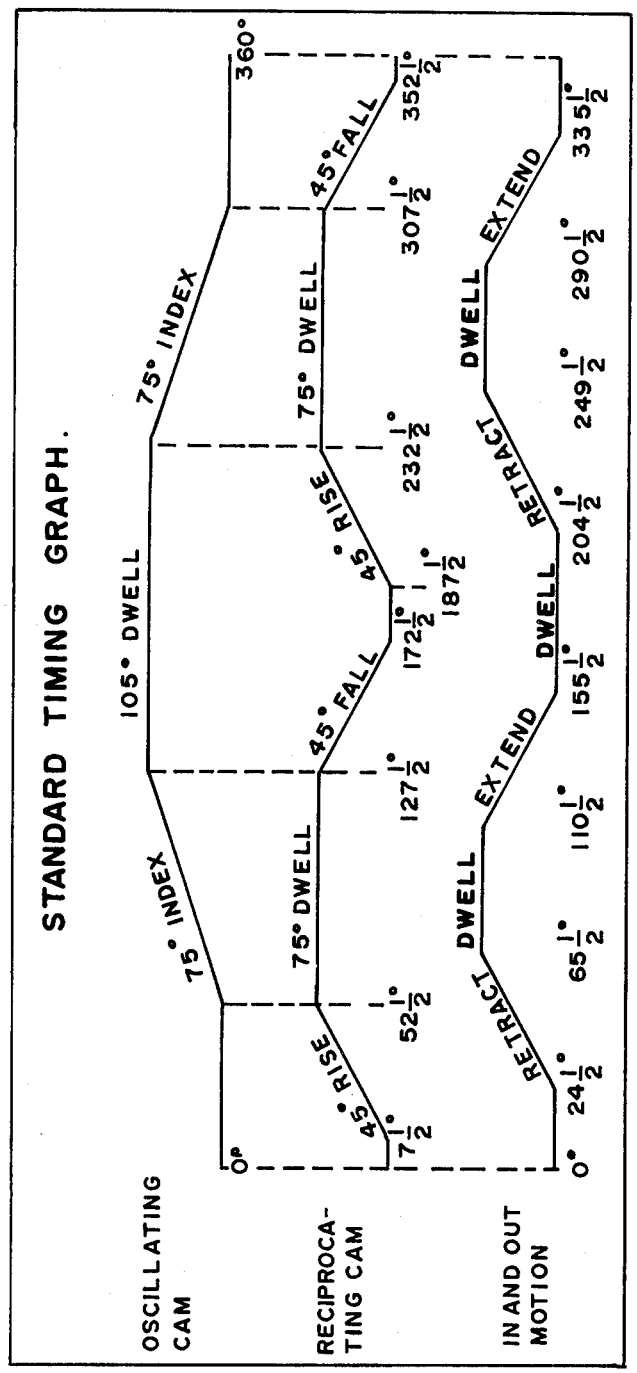
FIG. 4, as previously summarized, displays a graph of the timing sequences during the operation of a three motion parts handler constructed according to the design of this invention.

The roller follower hub 12 of this invention is secured to a shaft 26, and through the rotation of the indexing cam 11, which is provided with a series of spaced indexing portions 27 and 28, the roller follower hub 12 will be indexed by the cam for providing an oscillating or limited pivotal movement to the shaft 26. The standard timing for this particular indexing relationship between the roller gear drive and shaft 26 has already previously been identified and described as the oscillating cam action as disclosed in the graph as shown in FIG. 4.

This shaft 26 is also arranged for vertical reciprocating movement within the bearing support 29, which includes a bushing 30, such as a bronze form of bushing, which is in contact with the vertically shifting shaft 26 during operation of this mechanism. An oil seal 31 may be arranged surrounding the shaft 26 so as to prevent the escape of any lubricating oil therefrom. At the lower end of the support 29 there may be provided an o-ring 32 to also prevent the escape of any lubricating oil therefrom, particularly when such means for lubrication might be injected through the bearing support 29 and to the location between the reciprocating shaft 26 and the bushing 30. This bearing support 29 may be held in place within the housing 14 by means of a series of fastening means, such as the screws 33.

Figure 5:
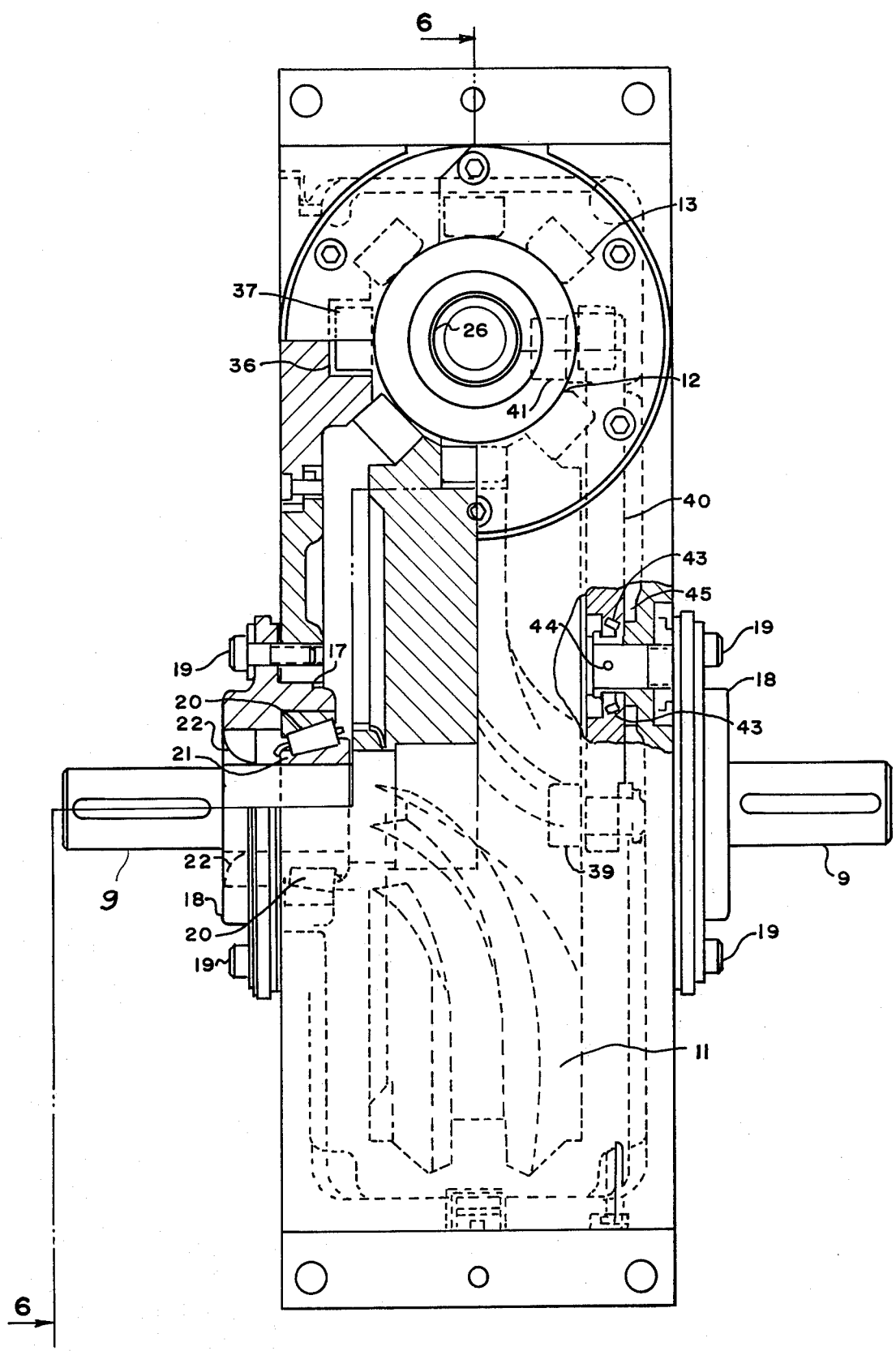
FIG. 5 provides a transverse section of the controller portion of this handler taken along the line 5—5 of FIG. 1.

As obviously can be seen, since the roller follower hub 12 is secured to the proximate lower end of the shaft 26, then it must by necessity reciprocate with the movement of the shaft within its bearing support 29. When this occurs, and particularly when the shaft 26 reaches its downwardmost shift, as shown in the hidden line outline as depicted at 34 in FIG. 6, the follower 35 that had previously been within the vicinity of and intermeshing with in the indexing cam 11 will be shifted out of engagement with the same as can be seen. But, since the follower hub and its intermeshing followers will be freed from the cam, some means desirably should be provided for maintaining these followers properly aligned with the indexing cam so as the shaft 26 is urged downwardly once again, its followers will be properly aligned for being shifted back into their engagement within the said indexing cam 11. Obviously, during this vertical reciprocating shift to the shaft 26, and its follower hub 12, as it moves through its fall and rise motions, the oscillating indexing cam 11 will be in its position of dwell, all of which can be seen from the timing graph displayed and previously explained in FIG. 4. Therefore, it is convenient to provide means for properly locating one of the followers just as the shaft 26 and the hub 12 are shifted out of engagement with the cam, and as can be seen in FIG. 5, a locating guide 36 is provided along one side wall of the housing 14, to achieve this end. As the shaft 26 and its hub 12 are once again shifted upwardly within the housing, the guided follower 37 will clear this locating guide 36 so that as the indexing cam 11 commences to turn, before either of its indexing portions 27 or 28 come into engagement with one of the followers 35 and the adjacent followers, it will first be free to index the hub 12 for providing this oscillating motion to the shaft 26.

Figure 6:
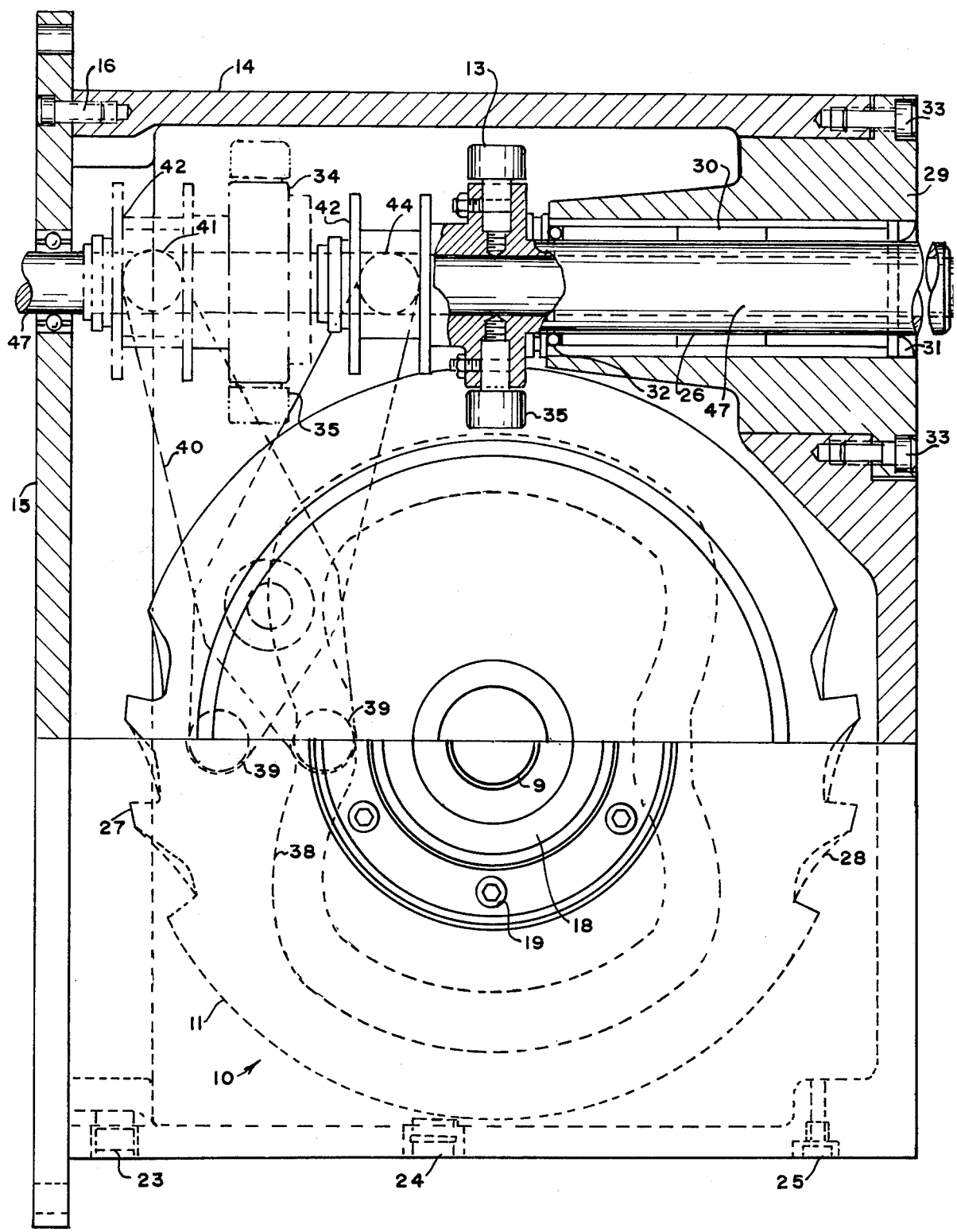
FIG. 6 provides a sectional view of the controller portion of this invention taken generally along the erratic section line 6—6 of FIG. 5.

The means for furnishing this reciprocating motion to the shaft 26 is also disclosed in FIGS. 5 and 6. To one side of the indexing cam 11 there is provided a face cam track 38, which may comprise either an integral face groove track within the cam, or perhaps may even be a track mounted upon the surface of said cam, but in either event, arranged within said track is a follower 39 that is provided proximate one end of a lever 40. At the other approximate end of this lever 40 is another follower like member 41 that is arranged within a throw collar 42 provided proximate the downward end of the shaft 26, and as can be seen, just below the securement of the hub 12 to the same said shaft. As can also be seen from FIG. 4, the rise and fall periods for this reciprocating cam track in addition to its period of dwell, readily explain the design of the configuration of the cam track 38 as shown provided within the surface of the indexing cam 11. This lever 40 is secured by means of tapered roller bearings 43 for pivotal motion about the pin 44 that secures to the side of the housing 14, and includes a thrust bearing 45 between said lever and the side wall of the housing so as to insure as frictionless pivot to the level 40 as possible. This level 40 may also be eccentrically mounted upon its pivot pin 44 so as to compensate for any moment of force generated due to the arrangement of the lever proximate the bottom of the indexing cam 11 to achieve the form of reciprocating motion intended.

Previous in the application the means for achieving the oscillating motion to the shaft 26, in addition to its reciprocating motion, and consequently the conduct of these motions to the conveying means 4 of this parts handler has been previously analyzed. Another movement that may be provided to this parts handler is the retract and extend motions of its transfer arm(s) 46, which motion is further shown in FIG. 4 of the timing graph. As shown in FIG. 7, the base 2 of the parts handler includes a shiftable shaft 47 that is arranged for vertical reciprocal movement therein, and said shaft extends further upwardly and concentrically through the previously explained shaft 26, as can be seen in FIG. 6, and further upwardly above the controller portion 3 and into the conveying means housing 48, as can also be seen in FIG. 8. This shaft 47 is mounted by means of bearings 49 within the base 2, while its upper portion is stabilized by means of its positioning within the aforesaid shaft 26. Connecting with the shaft 47 is a roller follower hub 50 having at least a pair of rollers 51 and 52 secured thereon, with said hub being rigidly fastened with the shaft 47 by means of a pair of adjustable split nut bushings 53 and 54. Since the motions imparted to this shaft 47, as seen in FIG. 4, comprise a vertical reciprocal that translates into an extend and retract linear movement for the transfer arm, the follower 52 is stabilized within a guide 55 and arranged for fixed vertical shifting therein. The other follower 51 is arranged within a face cam track 56 provided within the cam means 57, with the groove 56 being design formed within the cam so as to provide the degrees of retract and extend motions as shown in FIG. 4. The face cam 57 is rigidly secured upon its shaft 58, which shaft at one end is bearing mounted as at 59 within the base 2, while said shaft at the other side of the cam 57 is bearing mounted, as at 60, also to the base 2. At the outer end of the shaft 58 is a collar 61 which supports a reel 62 around which a belt, such as a cog belt, or the like, 63, is arranged for achieving a turn to the shaft 58 and its cam 57, so as to attain the timed reciprocating motion to the shaft 47. The reel 62 is positioned fixably to the collar 61 by means of any form of fastening means, as shown in 64. And as also can be seen from FIG. 1, the belt 63 that turns the shaft 58 is also arranged around a gear 65 that is secured to the lateral extension of the shaft 9 as projecting from one side of the controller section 3 of the invention. A belt tensioner mechanism 66 is provided for insuring the proper tauntness to the belt 63 in its transfer of motion to the shaft 58. Furthermore, a guard 67 provides safety coverage to this external drive between the controller section 3 and the base portion 2 of this parts handler.

As is also shown in FIG. 7, a clearance slot 68 is provided through the cam 57, and when aligned with the aperture 69 through the base portion 2 furnishes an access location for removal and replacement of the follower 51 in the event of its wear.

As previously explained, this reciprocating motion to the shaft 47 extends upwardly through the controller section 3 of the parts handler, with said shaft 47 further extending into the transfer section 4 of the invention. This can be seen in FIG. 8. The shaft 47 is provided with a throw collar 70, and arranged therein is a follower like member 71 that connects with one arm of the bell crank, with said bell crank having another follower like member 73 at its other end and which is arranged within another throw collar 74. The throw collar 74 is fixed upon the one arm 46 of the transfer arm assembly, with both of its arms 46 being arranged for reciprocating sliding movement within the series of bearing sleeve 75 provided within the housing of the conveying means 4. The frontal end of the arms 46 are provided with a mounting plate 76 that may be useful for mounting any form of pick-up means, such as previously described, and which furnishes the means for lifting, conveying, and depositing the parts to be worked. While a pair of arms 46 are shown in this transfer means, obviously, a single such arm could be used to achieve its intended purpose. Also, provided to the backside of the conveying and transfer means 4 is a shield 77 which furnishes an enclosure for the back of the arms 46 as they move into their retracted position. On the other hand, it is just as likely that these back sides of the arms 46, in their retracting position, could also mount any form of pick-up means, as previously explained with respect to the frontal portion of these arms, and be used for moving parts at this location also. For example, the same style of oscillating, reciprocating, and retracting and extending motions as provided to the front end of the arms 46 equally are available to their back ends also, and in the event that this parts handler may be arranged, as for example, intermediate to a pair of machine tools, both the front and back ends of the arms 46 may be used for parts placement. As a further alternative, there may be provided within the shield 77 a motor means 78 which may furnish independently the retract and extend motions to the arms 46, and thereby replace the need for the shaft 47, the action of its bell crank 72, and any of the camming mechanisms provided within the base 2 as previously explained. Such a motor means 78 may comprise by any style of electrical, electro-magnetic, pneumatic, hydraulic, or any other form of pulsing type motor that may furnish the proper timing for the retracting and extending of the arm(s) as shown. The use of the shaft 47, as motivated, and its bell crank 72, in addition to its arm drive, is displayed for illustration purposes for this preferred embodiment of the parts handler.

As a further alternative to the style of mechanism for providing this retracting and extending motions to the arm(s) 46 as previously explained, is shown in FIG. 9. Essentially, all of the motions as previously attained in the parts handler as heretofore described can be achieved from a single indexing cam, such as the one shown at 79. This cam could be arranged within the controller portion 3 of the parts handler, and in fact, could be the identical type of cam as previously shown and explained with respect to the indexing cam 11, as provided within the roller gear drive 10. The oscillating motion to the transfer means 4 could be achieved through the agency of a follower hub, with one of the followers 80 therein shown therein meshing within the indexing cam 79 so as to furnish indexing movement to its connecting shaft 81. The oscillating movement to this shaft 81 by means of the operation of the indexing cam 79 is quite identical to the oscillating movement attained for the shaft 26 as previously described. To one side of the indexing cam 79 may be provided a face cam track 82 which has a follower 83 located therein, which follower connects with one arm of the lever 84, while the other end of said level engages with a throw collar 85 that imparts a reciprocating rising and falling motion to the same shaft 81. This particular reciprocating motion to the shaft 81 is quite identical to the similar type motion as previously attained for the shaft 26 through the agency of the lever 40 as it engages within the face cam track provided to one side of the indexing cam 11, as previously analyzed. Furthermore, to the other side of the indexing cam 79 there may be provided another face cam track 86, and within this track is located a follower 87 that is provided at one end of an arm of a bell crank 88, while the other arm of the bell crank connects with another throw collar 89 that furnishes an up and down motion to the second shaft 90 that is concentrically and coaxially arranged within the shaft 81. This coaxial shaft 90 would extend upwardly into the transfer means 4, and cooperate with a style of drive, such as the bell crank 72, for attaining transferring motions in the nature of retracting and extending of the arm(s) 46. Hence, the three basic motions of this parts handler can also be attained from a single indexing cam 79, as herein described, and thereby eliminate the need for a further driving mechanism provided within the base portion 2 of this invention, as previously explained with respect to the embodiment shown in FIG. 7.

This application has described a preferred embodiment, in addition to alternative mechanisms, for achieving a plurality of synchronous movements particularly to a transfer means of a parts handler. The described embodiments are set forth herein this application for illustration purposes only, and are not meant to be limiting of the scope of patent protection desired to be achieved upon this parts handler. All variations or modifications to this preferred embodiment, or any of its alternate mechanisms, if encompassed within the spirit and scope of this invention, as described in its appended claims, are intended to be protected by any patent issuing hereon.

Having thus described the invention what is claimed and desired to be secured by Letters Patent is:

1. A multi-motion parts handler for use in transferring a part from one position and through a variety of motions to another and the intended position, including transfer means for use in supporting a part through its variety of said motions, said transfer means including at least one arm capable of reciprocal movement in a lineal direction, means operatively associated with said arm to induce said movement in the said lineal direction, a shaft coupled to said transfer means and disposed for inducing its reciprocating motion in another lineal direction, a roller gear indexing drive operatively associated with said shaft and provided for inducing the transfer means in an oscillating motion, said roller gear indexing drive including in combination an indexing cam and roller follower hub, said roller follower hub being secured to said shaft, means associated with said indexing cam for inducing said shaft and its coupled transfer means into its reciprocating movement in the said another lineal direction, motor means which when energized providing for rotation of said indexing cam and inducing movement of the said means operatively associated with said arm, a speed reducer coupled with said motor means and providing for a reduction in its speed of rotation, whereby upon actuation of said indexing drive and the means associated with the arm said transfer means and its arm is induced into a plurality of movements for precision transfer of a part.

2. The invention of claim 1 wherein the means operatively associated with said arm and capable of inducing said reciprocating motion in the said lineal direction includes a cam means.

3. The invention of claim 2 wherein said cam means operatively associated with said arm comprises a plate cam, said plate cam having an integral face cam track provided to one side and useful for inducing the reciprocating motion of the arm in the said lineal direction.

4. The invention of claim 3 and including a second shaft, said second shaft being coaxially arranged within said first shaft, said second shaft having a follower provided at its approximate downward end and being engaged with said cam means, the upper end of said second shaft being operatively associated with said arm of the transfer means, whereby the turning of said cam means induces a reciprocating motion of said second shaft which effects the said reciprocating motion of the same arm in a lineal direction.

5. The invention of claim 4 and including a bell crank disposed within said transfer means and being operatively associated with both the approximate upper end of said second shaft and the said arm for translating the reciprocating motion of said second shaft to the said arm.

6. The invention of claim 1 wherein two of said motions may occur substantially simultaneously.

7. The invention of claim 1 wherein two of said motions may occur substantially alternately.

8. The invention of claim 1 wherein said indexing cam comprises a dwell inside indexing cam having integral face cam tracks provided at least at one of its sides.

9. The invention of claim 1 wherein said indexing cam comprises a dwell outside indexing cam having integral face cam tracks provided at least at one of its sides.

10. The invention of claim 1 wherein said indexing cam comprises a dwell inside indexing cam having integral face cam tracks provided at either of its sides.

11. The invention of claim 1 wherein said indexing cam comprises a dwell outside indexing cam having integral face cam tracks provided at either of its sides.

12. The invention of claim 1 and including a lever, said lever having follower means provided proximate either of its ends, one of said follower means cooperating with said indexing cam, the other follower means cooperating with said shaft, whereby upon operation of said indexing cam the transfer means is induced into its reciprocating motion in the said another lineal direction.

13. The invention of claim 12 wherein the portion of said indexing cam cooperating with said lever follower comprises a face cam track.

14. The invention of claim 13 wherein the means operatively associated with said arm includes a second shaft, said second shaft being coaxially arranged within said first shaft, said shaft having a follower means operatively associated at its approximate downward end and cooperating with said indexing cam, the upper end of said second shaft being operatively associated with said arm of the transfer means, whereby the turning of said indexing cam induces a reciprocating motion in said second shaft which effects a reciprocating motion of the said arm in the lineal direction.

15. The invention of claim 14 wherein the follower means associated with the said second shaft is engaged within a face cam groove provided at the other side of said indexing cam.

16. The invention of claim 1 wherein the arm of the transfer means is provided with a pair of opposing ends, and each end being capable of transferring at least one part from a first position and through a variety of motions to another and the intended position.

17. The invention of claim 1 and including a guide means disposed aligned with said follower hub and provided for locating the said hub during a segment of one motion made by the transfer means during its operation.

* * * * *

UNITED STATES PATENT AND TRADEMARK OFFICE
CERTIFICATE OF CORRECTION

PATENT NO. : 4,036,374
DATED : July 19, 1977
INVENTOR(S) : Duane W. Woltjen

It is certified that error appears in the above–identified patent and that said Letters Patent are hereby corrected as shown below:

On the title page, change the title of the Assignee stated in the Letters Patent certificate as AMC Industries, Inc. to --- UMC Industries, Inc. ---.

Signed and Sealed this

Twenty-second Day of November 1977

[SEAL]

Attest:

RUTH C. MASON
Attesting Officer

LUTRELLE F. PARKER
Acting Commissioner of Patents and Trademarks